United States Patent [19]

Visser et al.

[11] Patent Number: 4,962,354

[45] Date of Patent: Oct. 9, 1990

[54] SUPERCONDUCTIVE VOLTAGE STABILIZER

[75] Inventors: Age T. Visser, Geneva; Robert C. Trendler, St. Charles, both of Ill.; Paul F. Koeppe, Cross Plains, Wis.

[73] Assignee: Superconductivity, Inc., Middleton, Wis.

[21] Appl. No.: 385,014

[22] Filed: Jul. 25, 1989

[51] Int. Cl.$^5$ .............................................. H01F 36/00
[52] U.S. Cl. ...................... 323/360; 323/222; 363/125; 505/869
[58] Field of Search .................. 323/222, 360; 363/14, 363/37, 124, 125

[56] References Cited

U.S. PATENT DOCUMENTS

| | | | |
|---|---|---|---|
| 2,987,631 | 6/1961 | Park, Jr. ............................ | 307/88.5 |
| 3,243,654 | 3/1966 | Wright .............................. | 315/289 |
| 3,701,906 | 10/1972 | Denel et al. ...................... | 307/149 |
| 3,800,256 | 3/1974 | Garwin ............................. | 335/216 |
| 4,079,305 | 3/1978 | Peterson et al. ................. | 363/14 |
| 4,122,512 | 10/1978 | Peterson et al. ................. | 363/14 |
| 4,348,630 | 9/1982 | Boenig et al. .................... | 323/207 |
| 4,431,960 | 2/1984 | Zucker .............................. | 323/340 |
| 4,438,474 | 3/1984 | Paice ................................ | 361/58 |
| 4,584,518 | 4/1986 | Higashino et al. ............... | 323/224 |
| 4,591,776 | 5/1986 | Sabrie .............................. | 318/717 |
| 4,599,519 | 7/1986 | Boenig ............................. | 363/14 |
| 4,609,831 | 9/1986 | Higashino et al. ............... | 307/270 |
| 4,695,932 | 9/1987 | Higashino ........................ | 363/14 |

Primary Examiner—Steven L. Stephan
Assistant Examiner—Jeffrey Sterrett
Attorney, Agent, or Firm—Neuman, Williams, Anderson & Olson

[57] ABSTRACT

A superconductive voltage stabilizer comprises an AC/DC converter, a voltage regulator, an energy storage cell and a superconducting energy storage coil. Alternating current is converted to direct current and stored in a superconducting coil. The stored direct current is selectively delivered to an energy storage cell to satisfy the energy requirements of a load. A voltage regulator senses the energy drawn from the energy storage cell and when appropriate releases stored energy from the superconducting coil to maintain a constant supply of energy to the load.

12 Claims, 5 Drawing Sheets

SUPERCONDUCTIVE VOLTAGE STABILIZER

BACKGROUND OF THE INVENTION

1. Field Of The Invention

This invention relates to a superconductive voltage stabilizer. In particular, the invention relates to a voltage stabilizer which utilizes the energy stored in a superconducting energy storage coil. In operation, the invention draws energy from a three phase power line, stores that energy in a superconducting energy storage coil, and then processes that energy into a form which can be used for feeding to a load. In this way, the load is isolated from the power distribution lines, and consequently does not induce voltage or current disturbances typically induced when a load draws energy from the power distribution system.

2. Background Of the Prior Art

The quality of power delivered by utility systems determines how well electrical and electronic equipment operates. Any disturbances to the power system can severely affect the equipment's performance. Power disturbances typically result from lightning, utility switching and utility outages. Such disturbances can also be created by the users of power through the switching of loads, ground faults, or abnormally high demand from heavy normal equipment operation. In each of these situations, the depletion of power through the line is severe enough to affect the operation of electrical equipment being used by other utility customers. In one example, the fluctuating load of a large welder in a mill producing wire mesh can cause lights and television sets to flicker for approximately 500 residential customers who received their power from the same feeder line used to supply power to the mill. Proposed solutions in this case included powering the equipment by a diesel generator during evening hours or installing a special electric utility line connected directly to the mill at a substantial cost.

The preceding case illustrates that a solution to power line disturbances is to upgrade the utility lines to the source of the excessive load. Such upgrading, however, is an expensive solution. Consequently, various other solutions have been proposed and are currently in use.

Many different types of power conditioning systems have been devised to prevent electrical and electronic equipment from creating or being affected by power line disturbances. Computer systems are particularly sensitive to variations which occur in the power being delivered to such systems. One solution currently being used to protect computer systems is the Uninterruptible Power Supply or UPS. The UPS isolates the computer from the power distribution line so that any changes in delivered power do not affect the computer's operation. The system is designed to automatically provide power without delay or transients during any period when the normal power supply is incapable of performing acceptably. However, the amount of current that can be provided by a UPS is limited. Consequently, such a system is unsuited for use in utility applications, particularly where motors must be started. The in-rush of current necessary to start a motor is too large to be supplied by a typical UPS.

In the case of motors, electronic motor starters have been successfully employed to start motors. An electronic motor starter reduces the voltage delivered to a motor at start-up thereby decreasing the load seen by the utility system. Although this reduces power line disturbances, it also reduces the current delivered to the motor. In the case where the driven system is a large load, oftentimes the motor will not start because of the reduced input voltage. Motor starters, however, are successfully used to supply smaller currents to motors driving lighter loads.

One recent development in voltage stabilization devices is the Static-VAR Compensator. The Static-VAR Compensator uses a configuration of inductors, capacitors, and high power electronics. These devices are theoretically designed to deliver large amounts of power to equipment such as arc furnaces or arc welders. At this time, however, Static-VAR Compensators have not been used widely enough to determine their performance under day-to-day conditions.

Another technique to control power disturbances is to store energy when demand is low and return that energy to the power system when demand is high. Battery systems have been used to store energy for this purpose, but battery systems have gained limited use because of various deficiencies. Efficient batteries are quite expensive, and since the amount of energy stored depends on the number of batteries used, large capacity battery systems are prohibitively expensive. Also, batteries produce hydrogen during operation, and because hydrogen is highly flammable, battery systems can pose serious safety problems.

More recent energy storage techniques employ superconducting technology to store energy to be returned later to the utility system. Peterson U.S. Pat. No. 4,122,512 describes a system storing alternating current power in a superconductive magnet or inductor. Three-phase alternating current is converted to direct current and stored in a superconducting inductor. During periods of high energy demands, the direct current is reconverted to alternating current and delivered back to the three-phase line. In this way, any sudden depletion in line voltage is compensated by the energy stored in the superconducting system.

Higashino, U.S. Pat. No. 4,695,932 discloses an energy storage circuit which converts three-phase alternating current to direct current. The DC current is then stored in a superconductive energy storage coil. A DC capacitor and chopper circuit are used to control the amount of direct current stored in the superconductive energy storage coil. This configuration allows the current capacity of the AC supply line equipment and the thyristor converter to be scaled down in accordance with service power established by the current rating of the coil, and also allows a reduction of operation losses.

Prior art systems have reduced power line disturbances in two ways. One method has been to make a device specifically designed for a particular load such as the UPS for computers or the electronic motor starter for motors. Such systems, although correcting some power line disturbances, have created other problems. Specifically, they are usually load-specific and not interchangeable, and they often cannot supply sufficient current to maintain proper operation of the load.

The other solution has been to install additional power lines or to store energy delivered by power lines during non-peak hours, and return the energy back to the utility system during peak hours, as in the Peterson and Higashino systems. Installing additional power lines, however, is an expensive solution to the problem. While Peterson and Higashino avoid the high cost of additional power lines, their devices are directed to supplying current to support a power system and not to correcting the problem at the source, namely the individual devices causing the problem of sudden high-load power consumption from the utility lines. Arc welders, arc furnaces, and motors, for example, each have specific current requirements due to their unique structures. Motors require large amounts of current only at start-up. Arc welders draw power intermittently during periods of welding. Since each piece of electrical machinery has its own individual power requirements, systems which attempt to maintain the power in a utility system generally do not prevent power disturbances, but simply correct overall deficiencies in the power lines when they occur.

OBJECTS OF THE INVENTION

A principal object of the invention is to provide a superconductive voltage stabilizer which delivers energy to a load without causing disturbances in the power delivered by utility systems.

It is also an object of the invention to provide the exact power necessary to drive a load without compromising the operation of the load utilizing the energy.

A further object of the invention is to provide a reduction in the cost of maintaining the quality of power delivered by utility systems.

SUMMARY OF THE INVENTION

These and other objects are achieved by a superconductive voltage stabilizer comprising a superconducting energy storage coil to store direct current obtained from the conversion of three-phase AC power. The stored direct current is selectively delivered to a load through the use of a voltage regulator and an energy storage cell. The energy storage cell stores DC energy until it is drawn by a load. When the load removes energy from the energy storage cell, the energy is replenished by the direct current which has been stored in the superconducting energy storage coil. The voltage regulator selectively delivers the direct current from the energy storage coil by monitoring the amount of energy removed by the load. The regulator operates to either direct energy to the energy storage cell or to direct the direct current to the superconducting energy storage coil.

The superconductive voltage stabilizer provides energy directly to a load, thereby isolating the load from the utility system. This configuration prevents the load from causing disturbances in the power system which would affect other consumers. Rather than attempting to maintain the quality of power delivered to a consumer by supplying stored energy back to a power system during times of heavy demand, the superconductive voltage stabilizer prevents machinery from affecting a power system in the first instance.

DESCRIPTION OF PREFERRED EMBODIMENTS

Figure 1:
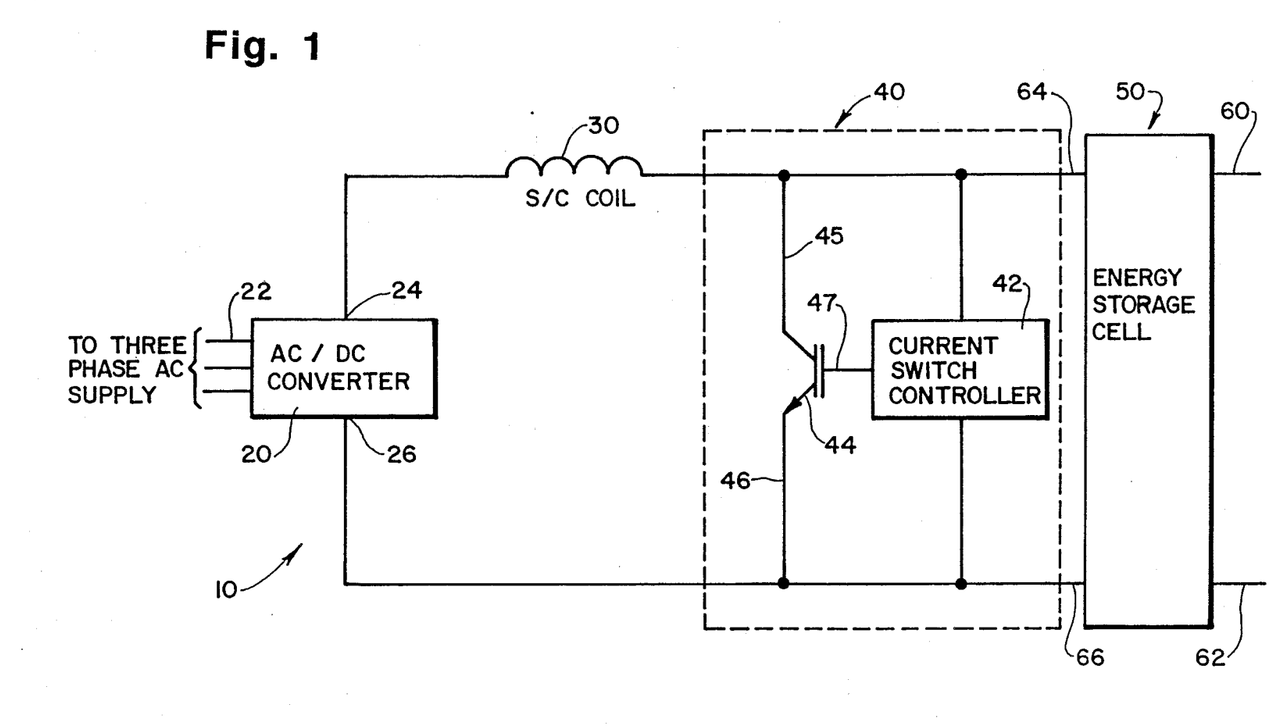
FIG. 1 is a schematic diagram of a superconductive voltage stabilizer construction in accordance with one embodiment of the present invention.

Referring now to FIG. 1, a superconductive voltage stabilizer embodying the present invention is generally designated by the numeral 10. Superconductive voltage stabilizer 10 includes an AC/DC converter 20, a superconducting coil 30, a voltage regulator 40 and an energy storage cell 50.

The superconductive voltage stabilizer 10 has an AC/DC converter for converting alternating current to direct current. Three-phase alternating current provided by an AC supply line is connected to AC input 22 of AC/DC converter 20. AC/DC converter 20 has a first DC terminal 24 and a second DC terminal 26. Once the alternating current input has been converted to direct current, a direct current output is available between the first and second DC terminals.

The direct current is then directed to a superconducting energy storage coil 30, through its connection to one of the DC terminals, which is used to store the energy created by the direct current and developed by AC/DC converter 20. Energy storage coil 30 stores energy depending on the control of voltage regulator 40. In its most basic embodiment, voltage regulator 40 comprises a current switch controller 42 and a current switch 44. AC/DC converter 20 controls the amount of current flowing through superconductive energy storage coil 30. Initially, current switch controller 42 activates current switch 44 so that a current path is created. When current switch 44 is activated, direct current can flow from first DC terminal 24, through energy storage coil 30, through current switch 44 and back through second DC terminal 26.

Once a sufficient amount of energy is stored in coil 30, an externally generated user control signal, described hereinafter in further detail, directs voltage regulator 40 to halt the current path through current switch 44 thereby directing the current through energy storage cell 50. Storage cell 50 comprises, in its most basic form, an energy storage capacitor 52. Energy storage cell 50 is connected in parallel with a load through a first output line 60 and a second output line 62. The voltage regulator 40, through the use of current switch controller 42, deactivates current switch 44 so that a new current path is created. Direct current can then flow from the first DC terminal 24, through energy storage coil 30, through a first input line 64 of energy storage cell 50, through energy storage cell 50, out through a second input line 66 of energy storage cell 50 and back through second DC terminal 26. Thus, energy is stored in energy storage cell 50 until the voltage across the cell 50 reaches a predetermined level. Once that level has been achieved, voltage regulator 40 directs the direct current away from energy storage cell 50 and back through the voltage regulator 40.

When energy storage cell 50 is fully charged, the supply of energy in energy storage cell 50 can be delivered to power a load through a first output line 60 and a second output line 62 of energy storage cell 50. Output lines 60 and 62 cooperate to provide an output current path to the load. As the load draws energy away from energy storage cell 50, the voltage across cell 50, measured between the first input line 64 and the second input line 66 begins to drop. Once the voltage across cell 52 drops to a set level, it is sensed by voltage regulator 40. At that time, current switch controller 42 deactivates current switch 44, so that energy stored in superconducting coil 30 is delivered to energy storage cell 50. The delivery of stored energy continues until the voltage across energy storage cell 50 reaches a predetermined maximum value. At that point, voltage regulator 40 senses cell 50 is fully charged, and through current switch controller 42, activates current switch 44 so that current flows once again flows through current switch 44.

Current switch 44 can comprise an insulated gate bipolar transistor (IGBT) having a collector lead 45, an emitter lead 46, and a gate lead 47. Collector lead 45 is coupled to first input line 64, emitter lead 46 is coupled to second input line 66, and gate lead 47 is coupled to current switch controller 42, which controls the conduction of IGBT 44 through gate lead 47. Various other devices can be used in place of IGBT 44 and can include gate-turn-off thyristors and silicon controlled rectifiers.

Thus, energy storage cell 50 supplies energy to the load. As energy is drawn from cell 50 by the load, voltage regulator 40 senses the voltage across the cell 50, and controls the amount of energy released from coil 30 to cell 50. A portion of the direct current stored in coil 30 is thereby delivered to energy storage cell 50 in accordance with the energy requirements of the load.

Figure 2:
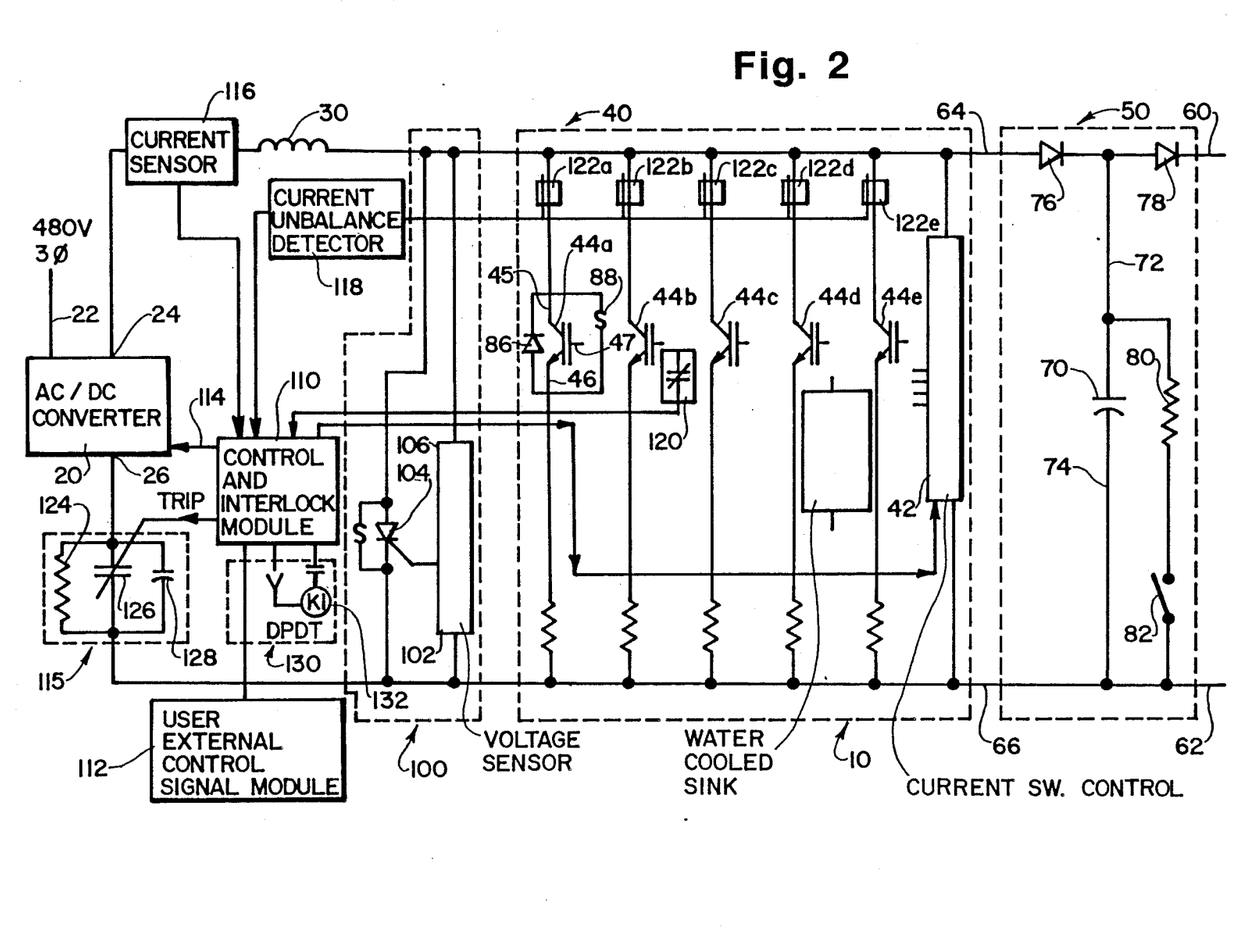
FIG. 2 is a schematic diagram showing another embodiment of the present invention.

FIG. 2 is a circuit diagram of another embodiment of superconductive voltage stabilizer 10. The illustrated superconductive voltage stabilizer 10 includes an AC/DC converter 20, a superconducting energy storage coil 30, a voltage regulator 40 and an energy storage cell 50, all employed previously in the configuration of FIG. 1. The circuit of FIG. 2 also includes additional circuitry which provides a more stable and reliable design.

As shown in FIG. 2, energy storage cell 50 includes an energy storage capacitor 70. Energy storage capacitor 70 has a first terminal 72 and a second terminal 74. First input line 64 is coupled to first terminal 72 through first diode 76 so that the cathode of first diode 76 is connected to first terminal 72 of energy storage capacitor 70. First terminal 72 is also coupled to first output line 60 through a second diode 78. Second diode 78 is oriented such that its anode is connected to first terminal 72. Second terminal 74 is coupled to both second input line 66 and second output line 62.

First diode 76 and second diode 78 are included in energy storage cell 50 to control the direction of energy flow and to protect circuit components. Second diode 78 is included to protect capacitor 72 from any undesirable currents which might be generated by the load and fed back into the superconductive voltage stabilizer 10. First diode 76 provides a similar function, and prevents energy storage capacitor 70 from discharging through current switch 44 thereby protecting the remaining circuitry from undesirable currents, including the voltage regulator 40 and AC/DC converter 20.

Another safety feature included in energy storage cell 50 is resistor 80 and switch 82. Resistor 80 and switch 82 are serially connected and in parallel combination with energy storage capacitor 70. Resistor 80 is a bleeder resistor which, in cooperation with normally open switch 82, is used to dissipate the energy in capacitor 70 whenever the superconducting voltage stabilizer is shut down. When superconductive voltage stabilizer 10 requires maintenance, switch 82 will be closed so that energy stored in capacitor 70 will be dissipated to prevent shock hazard.

FIG. 2 illustrates a circuit diagram for another voltage regulator 40. Current switch controller 42 controls the conduction of five current switches 44a–44e. The number of current switches 44 can vary depending on the amount of current to be conducted and the current capacity of the current switches used. Current switch controller 42 monitors the voltage across first input line 64 and second input line 66 to determine whether current switches 44a–44e should conduct. The circuit also includes watercooled sink 84 to maintain the proper operating temperature of high power current switches 44a–44e.

Protection diode 86 is also included in this circuit to protect current switches or IGBTs 44. Protection diode 86 is connected across the emitter and collector of IGBT 44, with the anode connected to the collector. A snubber 88 is configured in parallel with protection diode 86, and is used to prevent spikes from damaging the circuit.

Figure 3:
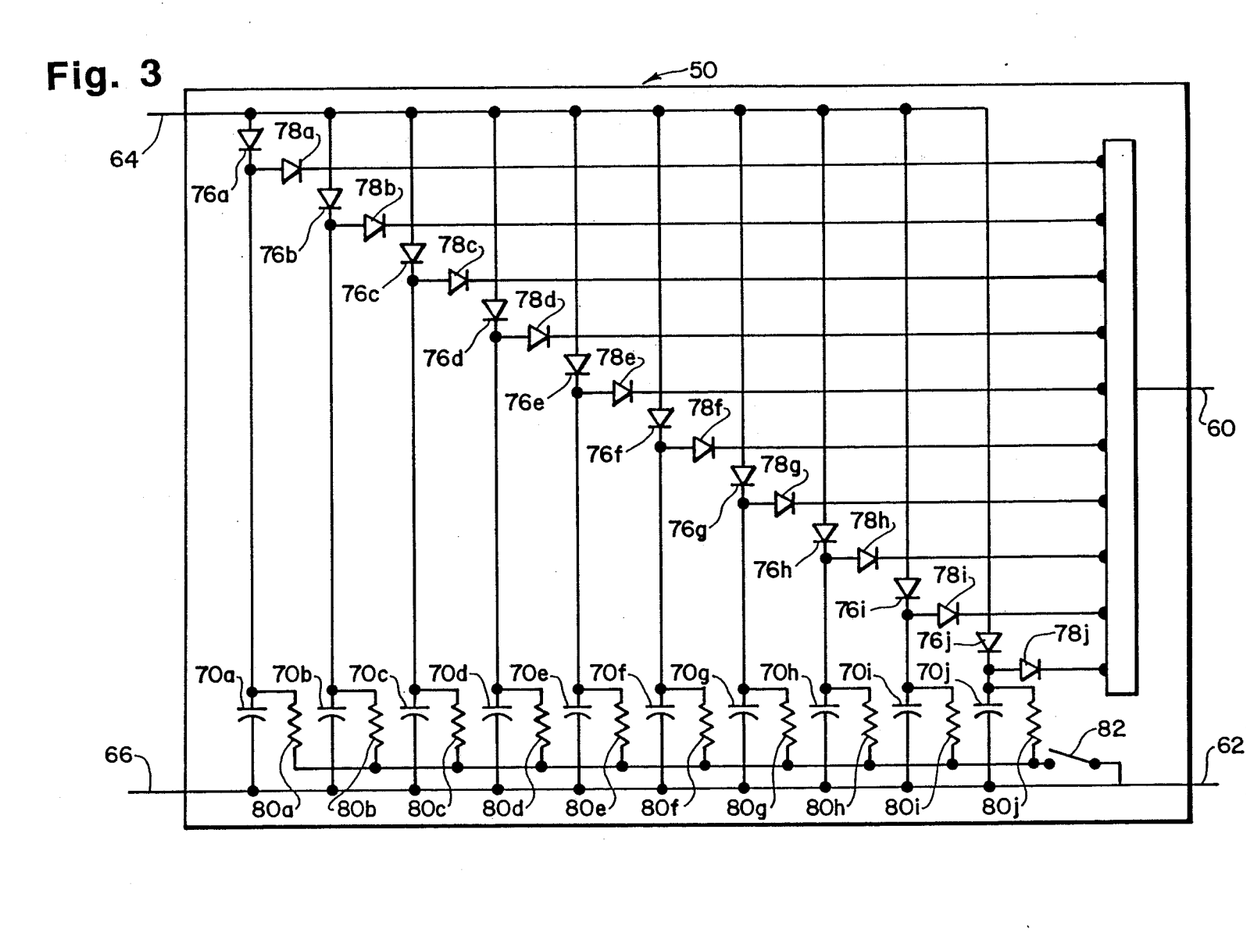
FIG. 3 is a schematic diagram of an energy storage cell.

As illustrated in FIG. 2, overvoltage protector 100 is used to monitor the voltage across voltage regulator 40 and energy storage cell 50, and to bypass those circuits when the voltage level becomes unacceptable. Overvoltage protector 100 is connected in parallel with voltage regulator 40 and energy storage cell 50. When the voltage level increases to an unacceptable level, voltage sensor 102, which is in parallel with voltage regulator 40, activates thyristor 104 through the gate thereof. Thyristor 104 conducts, so that a current path is created which bypasses the circuitry of voltage regulator 40 and energy storage cell 50. Thyristor snubber 106 is connected across the anode and cathode of thyristor 104 as illustrated in FIG. 3.

Various control and protection features are handled by control and interlock module 110 of FIG. 2. As described hereinbefore, energy is initially stored in superconducting energy storage coil 30 and later delivered to energy storage cell 50 is initially stored with energy at a time determined by the needs of the driven system. Sometime before the load requires energy, the operator will direct current switch controller 42 to halt the current path through current switches 44, thereby delivering energy to energy storage cell 50. The operator, through user control signal module 112, directs control and interlock module 110 to direct current switch controller 42 to turn off current switches 44. Consequently, the current path which did flow through current switches 44, now flows through energy storage cell 50. Energy is stored in energy storage cell 50 until the voltage across the cell 50 reaches a predetermined level.

The remaining protection features in FIG. 2 are controlled by control and interlock module 110. Interlock module 110 controls AC/DC converter 20 through control line 114 and dump circuit 115. During circuit operation, interlock module 110 monitors the current flowing through the superconducting coil 30 by current sensor or transductor 116. Two characteristics of voltage regulator 40 are also monitored. First, current unbalance detector 118 detects whether the current flowing through current switches 44 vary with respect to one another outside a predetermined range. Secondly, temperature sensor 120 detects the temperature of the watercooled sink 84.

As shown in FIG. 2, current sensor 116 detects the current through superconducting coil 30 by the use of a transducer 116. Transducer 116 determines a current value by sensing the magnetic field created by current flow. When the current value reaches a threshold value, interlock module 110 senses that a limit has been reached and then terminates the conversion of alternating current through control line 114, ceasing the supply of direct current to superconducting coil 30. Current will continue to flow through the coil 30, however, since a current path is provided through AC/DC converter 20.

Current unbalance detector 118 detects the current through the current switches 44a–44e by cores 122a through 122e. If the current conducted through any of switches 44a–44e is greater or less than a predetermined value of current being conducted through any other of switch 44a–44e, interlock module 110 detects this difference and trips the dump circuit 112. Dump circuit 112 comprises the parallel combination of dump resistor 124, normally closed dump switch 126, and dump capacitor 128. When tripped, normally closed dump switch 126 opens so that current flows through a parallel combination of dump resistor 124 and dump capacitor 128.

Temperature sensor 120 detects the temperature of watercooled sink 84. If the temperature reaches a high level, indicating that current switches 44a–44e are operating improperly, interlock module 110 trips dump circuit 112 to prevent circuit damage.

Interlock module 110 is also provided with service module 130, which consists of a user accessible double-pole double-throw switch 132. Switch 132 can be actuated to close switch 82, thereby bleeding off the energy on energy storage capacitor 70 so that tests or repair work may be safely performed.

FIG. 3 is a circuit diagram of another embodiment of energy storage cell 50. FIG. 3 illustrates an energy storage cell 50 comprising ten energy storage capacitors 70a–70j to store energy to be delivered to a load. The load is connected to first and second output lines 60 and 62. As seen previously in the energy storage cell 50 of FIG. 2, each of the capacitors 70a–70j is protected by a corresponding second diode 78a–78j. In this way, each capacitor is protected from any energy which may be reflected back into energy storage cell 50 from the load. Each capacitor 70a–70j also has associated with it a corresponding first diode 76a–76j. Diodes 76a–76j protect the remainder of the circuit, including voltage regulator 40 and AC/DC converter 20, from damage which might result from a malfunction in energy storage cell 50. Each capacitor 70a–70j also has associated with it a corresponding bleeder resistor 80a–80j. Resistors 80a–80j bleed energy from capacitors 80a–80j when bleeder switch 82 is closed.

The superconductive voltage stabilizer described herein can be used to deliver energy to many different types of loads, especially loads requiring large amounts of power for short periods of time. Devices having these requirements include arc welders, arc furnaces, and three phase or single phase motors require extra power during start-up.

Figure 4:
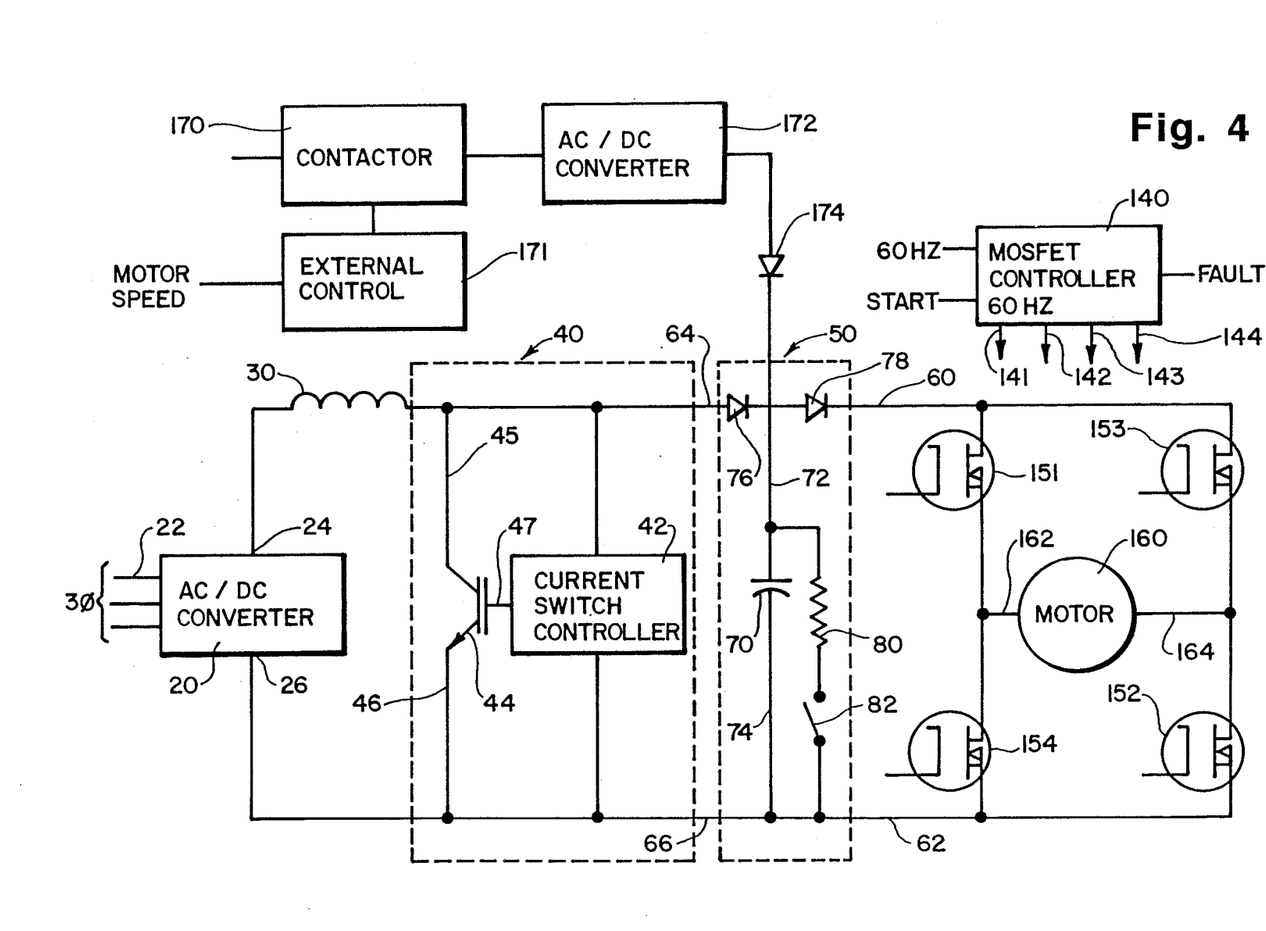
FIG. 4 is a schematic diagram of one application of the present invention for starting a single-phase motor.

The superconductive voltage stabilizer described herein is particularly well suited to start motors. One particular application of the present invention for starting a single phase motor is illustrated in FIG. 4. In this configuration, a MOSFET or IBGT controller 140 operating at the AC line frequency and having a first control line 141, a second control line 142, a third control line 143, and a fourth control line 144. Each control line is coupled to the gate of its respective control MOSFET or control IGBT which includes a first control MOSFET 151, a second control MOSFET 152, a third control MOSFET 153, and a fourth control MOSFET 154. The drains of first control MOSFET 151 and third control MOSFET 153 are coupled to first output line 60. The source of first control MOSFET 151 is coupled to the drain of fourth control MOSFET 154 and the source of third control MOSFET 153 is coupled to the drain of second control MOSFET 152. The sources of fourth control MOSFET 154 and second control MOSFET 152 are coupled to second output line 62.

A single-phase motor 160 is coupled to the drain/source coupling of first control MOSFET 151 and fourth control MOSFET 154 through first motor terminal 162, and the drain/source coupling of third control MOSFET 153 and second control MOSFET 152 through second motor terminal 164.

To start a single-phase motor 160, MOSFET controller 140 selectively conducts first control MOSFET 151 and second control MOSFET 152 simultaneously and third control MOSFET 153 and fourth control MOSFET 154 simultaneously, so that when first and second MOSFETs are conducting, third and fourth MOSFETs are not, and when third and fourth MOSFETS are conducting, first and second MOSFETs are not. Consequently, single-phase motor 160 is started by the square wave delivered to motor 160 at first motor terminal 162 and second motor terminal 164.

Once motor 160 is up to speed, a first contactor 170 is energized by external control 171 to connect the single-phase line to a second AC/DC converter 172 whose output is coupled to first terminal through motor diode 174 whose cathode is connected to first terminal 72. This configuration allows the power to be supplied by the single-phase line once the motor 160 has been started. Thus, motor 160 is isolated from the utility system during start-up and consequently cannot affect the utility system and its other consumers. This principle can be expanded to three-phase motors as discussed below.

Figure 5:
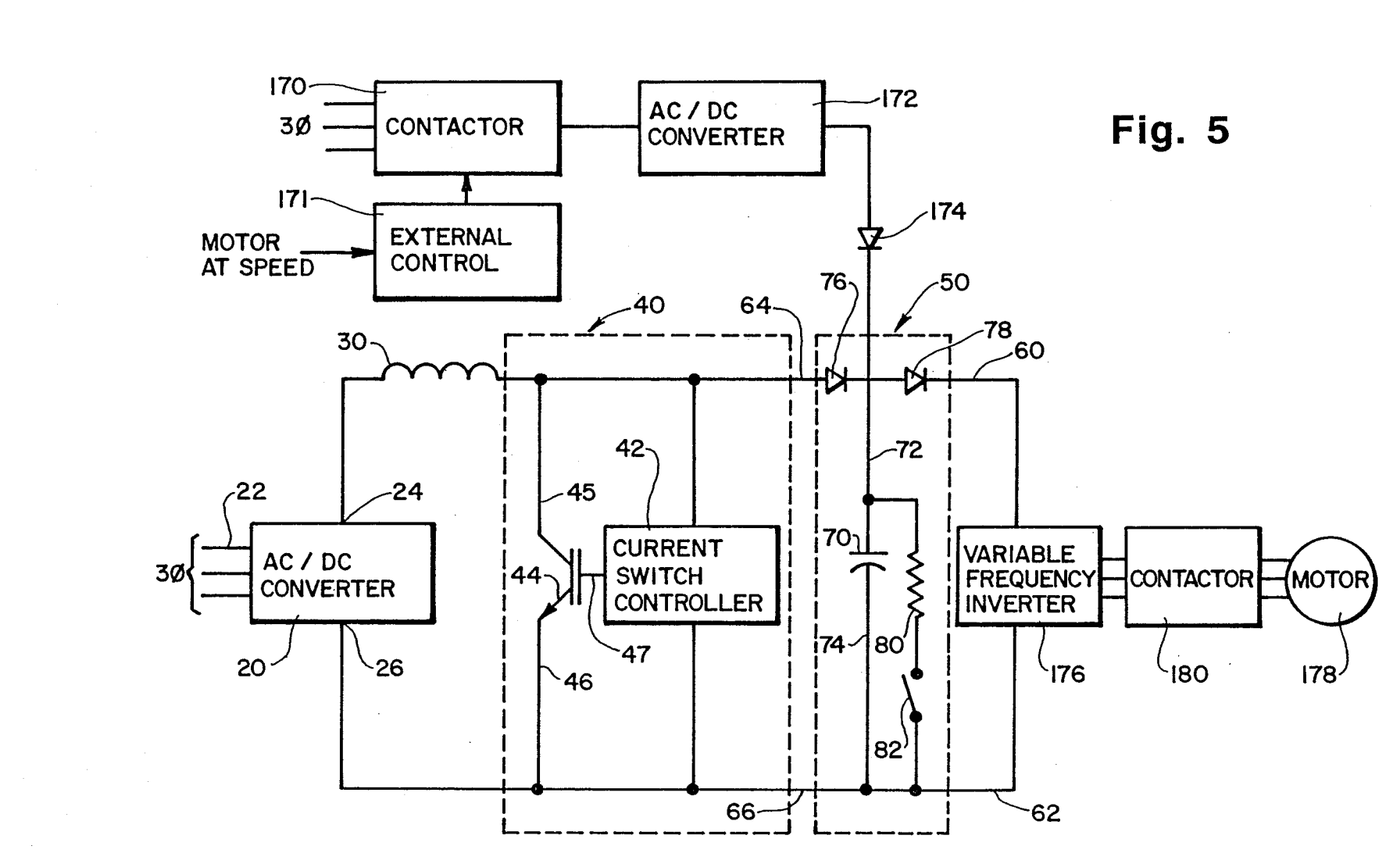
FIG. 5 is a schematic diagram of one application of the present invention for starting a three-phase motor.

In another application, as seen in FIG. 5, the superconductivity voltage stabilizer can be used to start a three-phase motor. In this configuration a variable frequency inverter 176 is connected across first output line 60 and second output line 62. Variable frequency inverter 176 takes the energy stored in energy storage cell 50 and converts it to three-phase alternating current whose frequency can be varied. The three-phase alternating current seen at the output of variable frequency controller 176 is coupled to a three-phase AC motor 178 through a contactor 180 which can be energized to connect the output of variable frequency inverter 176 to motor 178. Once motor 178 is up to speed, first contactor 170 is energized by external control 171 to connect the three-phase line to second AC/DC converter 172 whose output is coupled through motor diode 174 whose cathode is connected to first terminal 72. Consequently, power can be supplied by the three-phase line once motor 178 has been started and it has attained its steady-state operating speed, and its operation is therefore stabilized.

In still another embodiment, the addition of a variable speed drive to the superconductive voltage stabilizer of FIG. 2 could be used to start a motor. The DC link of a variable speed drive is connected to first output line 60 and second output line 62. The DC link draws energy from energy storage cell 50 to start the motor. Once the motor is started, the variable speed drive is used to continue driving the motor once it has started. The initial start-up current is delivered to the motor after being stored in superconductive energy storage coil 30. The employment of coil 30 prevents the motor from excessively loading the AC supply line, and thereby prevents motor in-rush currents from detrimentally affecting the utility system.

The foregoing description of the invention has been presented for purposes of illustration and description. It is not intended to limit the invention to the precise forms disclosed, and obviously many modifications and variations are possible in light of the above teachings.

We claim:

1. A superconductive voltage stabilizer comprising: an energy storage cell for supplying energy to a load, said energy storage cell having a first input line, a second input line, a first output line, and a second output line, said output lines coupled to said load and cooperating to provide an output current path to said load;
a voltage regulator in parallel with said first input line and said second input line;
an AC/DC converter with an AC input connected to an AC supply line and producing a direct current output having a first DC terminal and a second DC terminal with said first DC terminal coupled to said first input line through a superconducting energy storage coil storing said direct current output and said second DC terminal coupled to said second input line whereby said energy supplied to said load to stabilize the operation of said load is restored to said energy storage cell by said voltage regulator which senses the voltage across said energy storage cell and delivers a portion of said direct current output stored in said superconducting energy storage coil to said energy storage cell in accordance with the energy requirements of said load.

2. A superconductive voltage stabilizer as defined in claim 1, wherein said energy storage cell includes an energy storage capacitor having a first terminal and a second terminal wherein said first input line is coupled to said first terminal, said second input line is coupled to said second terminal, said first terminal is coupled to said first output terminal and said second terminal is coupled to said second output line.

3. A superconductive voltage stabilizer as defined in claim 2, wherein said first input line is coupled to said first terminal through a first diode and the cathode of said first diode is connected to said first terminal, and said first terminal is coupled to said first output line through a second diode wherein the anode of said second diode is connected to said first terminal.

4. A superconductive voltage stabilizer as defined in claim 3, wherein a series combination of a resistor and a switch are in a parallel combination with said energy storage capacitor.

5. A superconductive voltage stabilizer as defined in claim 1, wherein said voltage regulator includes a current switch controller and a current switch wherein said current switch controller controls the conduction of said current switch according to the voltage across said energy storage cell.

6. The superconductive voltage stabilizer as defined in claim 5 wherein said current switch is an IGBT having a collector lead coupled to said first input line, an emitter lead coupled to said second input line, and a gate lead coupled to said current switch controller whereby said current switch controller controls the conduction of said IGBT through said gate lead.

7. A superconductive voltage stabilizer as defined in claim 1, including a control and interlock module and said voltage regulator includes a current switch controller and a current switch wherein said control and interlock module controls the conduction of said current switch through control of said current switch controller.

8. A superconductive voltage stabilizer as defined in claim 1, including an overvoltage protector connected in parallel with said voltage regulator and said energy storage cell whereby said overvoltage protector monitors voltage across said voltage regulator and said energy storage cell to bypass each when said voltage becomes unacceptable.

9. A superconductive voltage stabilizer as defined in claim 8, wherein said overvoltage protector includes a voltage sensor, a thyristor, and a thyristor snubber whereby said thyristor snubber is connected across an anode and a cathode of said thyristor, and said voltage sensor controls the conduction of said thyristor through connection to a gate thereof.

10. A superconductive voltage stabilizer as defined in claim 1, including a control and interlock module to monitor a current sensor, a current unbalance detector and a temperature sensor to thereby control a dump circuit and to turn off the conversion of alternating current whenever a critical current value or critical temperature has been sensed.

11. A superconductive voltage stabilizer as defined in claim 1, including a first control MOSFET and a third control MOSFET, the drains of said first control MOSFET and said third control MOSFET connected to said first output line, the source of said first control MOSFET connected to the drain of a fourth control MOSFET, the source of said third control MOSFET connected to the drain of a second control MOSFET, the sources of said fourth control MOSFET and said second control MOSFET connected to said second input line wherein said first and said second MOSFETs are adapted to conduct simultaneously and said third and said fourth MOSFETs are adapted to conduct simultaneously so that when said first and said second MOSFETs are conducting said third and said fourth MOSFETs are not and when said third and said fourth MOSFETs are conducting said first and said second MOSFETs are not so as to start a single-phase AC motor.

12. A superconductive voltage stabilizer as defined in claim 1, including a means for converting the energy stored in said energy storage cell to an alternating current for application to said load and a means for supplying direct current obtained from conversion of power system alternating current to said energy storage cell once said load has achieved steadystate operation.

* * * * *